US012633095B2

(12) United States Patent
Lin et al.

(10) Patent No.: US 12,633,095 B2
(45) **Date of Patent: \*May 19, 2026**

(54) AUTOMATIC EFFICIENT SMALL MODEL SELECTION FOR MONOCULAR DEPTH ESTIMATION

(71) Applicant: Acer Incorporated, New Taipei (TW)

(72) Inventors: Kai-Hsiang Lin, New Taipei (TW);
Hung-Chu Chou, New Taipei (TW);
Tung-Chan Tsai, New Taipei (TW);
Chieh-Sheng Wang, New Taipei (TW);
Shih-Hao Lin, New Taipei (TW);
Wen-Cheng Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 405 days.

This patent is subject to a terminal disclaimer.

(21) Appl. No.: 18/325,976

(22) Filed: May 30, 2023

(65) Prior Publication Data

US 2024/0404258 A1    Dec. 5, 2024

(51) Int. Cl.
*G06V 10/776*      (2022.01)
*G06T 7/10*        (2017.01)
*G06T 7/50*        (2017.01)
*G06V 10/82*       (2022.01)
*G06V 20/70*       (2022.01)

(52) U.S. Cl.
CPC .............. *G06V 10/776* (2022.01); *G06T 7/10* (2017.01); *G06T 7/50* (2017.01); *G06V 10/82* (2022.01); *G06V 20/70* (2022.01); *G06T 2207/20021* (2013.01); *G06T 2207/20081* (2013.01); *G06T 2207/20084* (2013.01)

(58) Field of Classification Search
CPC ...... G06V 10/776; G06V 10/82; G06V 20/70; G06V 10/764; G06V 10/774; G06T 7/10; G06T 7/50; G06T 2207/20021; G06T 2207/20081; G06T 2207/20084; G06T 19/00; G06N 20/00; G06N 3/045; G06F 9/5083
See application file for complete search history.

(56) References Cited

U.S. PATENT DOCUMENTS

| | | | | | |
|---|---|---|---|---|---|
| 11,308,365 | B2 * | 4/2022 | Wen | ......................... | G06F 16/51 |
| 2018/0300610 | A1 * | 10/2018 | Pye | ......................... | G06N 3/045 |

(Continued)

*Primary Examiner* — Xuemei G Chen

(74) *Attorney, Agent, or Firm* — Polsinelli LLP

(57) ABSTRACT

Systems and methods are described for selecting models to perform monocular depth estimation. A computing device may receive a plurality of image and select an image from the plurality of images to evaluate a first machine-learning model and a plurality of machine-learning models are smaller than the first machine-learning model. The computing device may process the image using a first machine-learning model to generate a first predicted result. The computing device may also process the image using the plurality of machine-learning models to generate at least a second predicted result and a third test data set. The computing device may select a second machine-learning model from the plurality of machine-learning models based on a comparison of the first predicted result with the at least the second predicted result and the third test data set. The computing device may then process the plurality of images using the second machine-learning model.

20 Claims, 6 Drawing Sheets

(56) References Cited

U.S. PATENT DOCUMENTS

| | | | |
|---|---|---|---|
| 2021/0279595 A1* | 9/2021 | Sridhar | G06N 3/098 |
| 2022/0101098 A1* | 3/2022 | Li | G06N 3/042 |
| 2022/0230421 A1* | 7/2022 | Yang | H04L 67/01 |
| 2022/0286658 A1* | 9/2022 | Tan | G06V 40/18 |
| 2022/0335303 A1* | 10/2022 | Haidar | G06N 3/094 |
| 2023/0075836 A1* | 3/2023 | Tang | G06V 10/30 |
| 2023/0110925 A1* | 4/2023 | Akbari | G06V 10/82 |
| | | | 706/46 |
| 2023/0215140 A1* | 7/2023 | Sikka | G06V 10/72 |
| | | | 382/157 |
| 2023/0222817 A1* | 7/2023 | Sun | G06N 3/08 |
| | | | 382/103 |
| 2023/0232080 A1* | 7/2023 | Kim | G06F 1/3212 |
| | | | 382/155 |
| 2023/0244910 A1* | 8/2023 | Kim | G06N 3/045 |
| | | | 706/14 |
| 2023/0252294 A1* | 8/2023 | Gu | G06N 3/0495 |
| | | | 706/25 |
| 2023/0252769 A1* | 8/2023 | Bhat | G06V 10/761 |
| | | | 382/157 |
| 2023/0409876 A1* | 12/2023 | Agrawal | G06N 3/045 |
| 2024/0086709 A1* | 3/2024 | Donderici | G06N 3/048 |
| 2024/0249182 A1* | 7/2024 | Kirshenboim | G06N 3/0985 |
| 2024/0296335 A1* | 9/2024 | Jandial | G06N 3/096 |
| 2024/0296338 A1* | 9/2024 | Yeom | G06N 3/045 |
| 2024/0346326 A1* | 10/2024 | Tyou | G06N 3/045 |
| 2024/0394509 A1* | 11/2024 | Cheon | G01B 11/14 |
| 2024/0412075 A1* | 12/2024 | Zhao | G06N 3/082 |
| 2025/0165782 A1* | 5/2025 | Sun | G06N 3/04 |
| 2025/0259068 A1* | 8/2025 | Zisserman | G06N 3/045 |

* cited by examiner

AUTOMATIC EFFICIENT SMALL MODEL SELECTION FOR MONOCULAR DEPTH ESTIMATION

TECHNICAL FIELD

This disclosure relates generally to model selection, and more particularly to automatic model selection for monocular depth estimation.

BACKGROUND

The learning capacity of deep neural networks can be positively correlated to the number of parameters and the quantization precision of the parameters. As a result, a large deep neural network (e.g., deep neural networks with a quantity of parameters greater than a threshold quantity) may achieve a high degree of accuracy for general or non-specific input datasets. Yet, large deep neural networks can be associate with a number of disadvantages. For instance, large deep neural networks may have a large memory footprint, consume a large quantity of processing resources, high latency (which can be problematic for real-time operations), use a large quantity of training datasets to train the large deep neural network to a requisite accuracy, take a long time to train, etc. Thus, while large deep neural networks may be trained to an acceptable accuracy for certain datasets, the large deep neural networks may not be usable in many situations.

SUMMARY

Methods are described herein for model selection for monocular depth estimation. The methods may include receiving a plurality of images; selecting one or more images from the plurality of images; processing the one or more images using a first machine-learning model to generate a first predicted result; processing the one or more images using a plurality of machine-learning models to generate at least a second predicted result and a third test data set, wherein the first machine-learning model is larger than the plurality of machine-learning models; selecting, based on a comparison of the first predicted result with the at least the second predicted result and the third test data set, a second machine-learning model from the plurality of machine-learning models; and processing the plurality of images using the second machine-learning model.

Systems described herein model selection for monocular depth estimation. The systems may include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
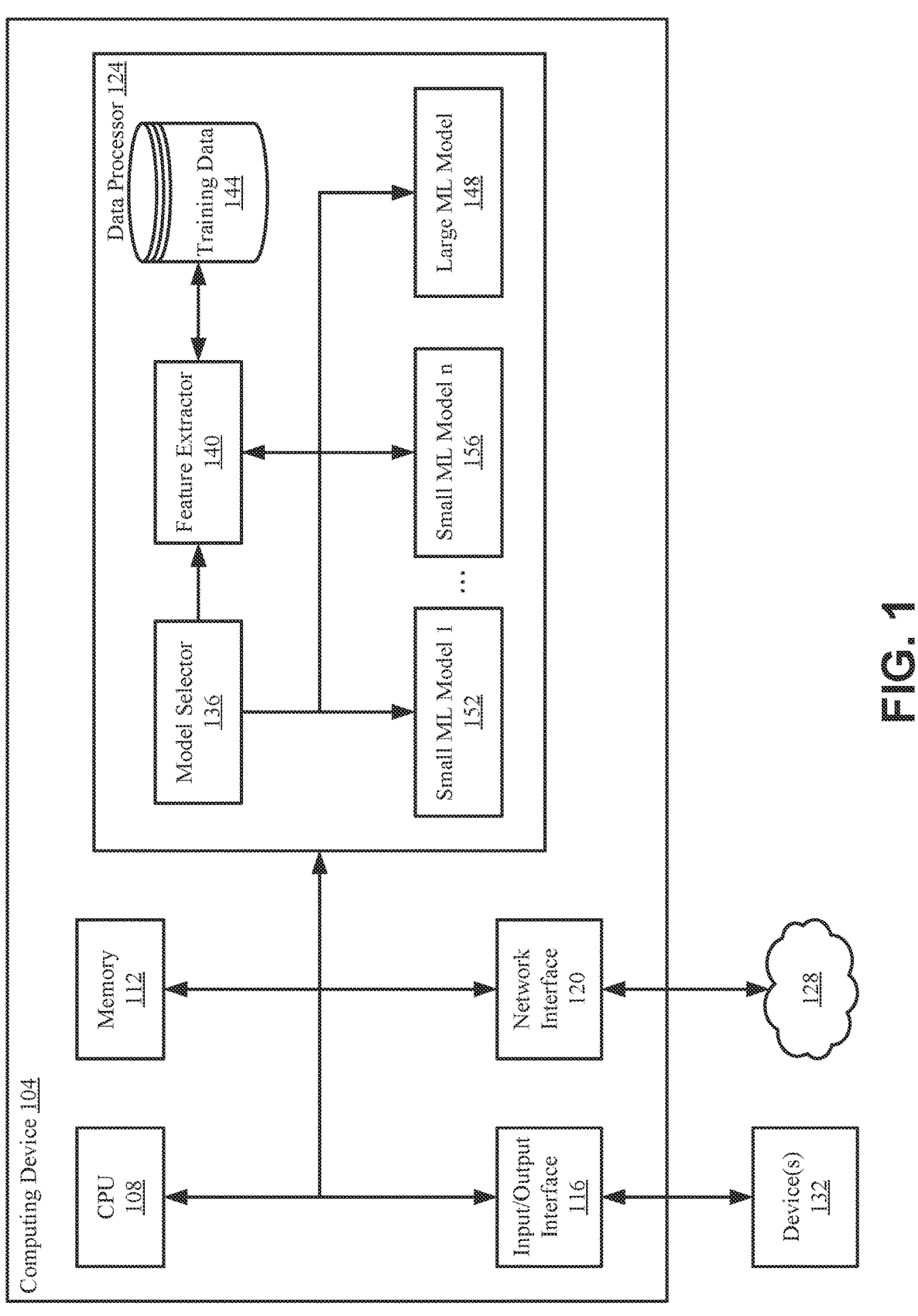
FIG. 1 illustrates a block diagram of an example system for selecting machine-learning models configured to process disparate datasets according to aspects of the present disclosure.

The learning capacity of machine-learning models may be correlated with the quantity of parameters or layers of the model. Increasing the learning capacity (e.g., by increasing the quantity of parameters or layers) may enable the machine-learning model to learn from broader datasets. For example, increasing the quantity of parameters of a classifier may increase the classifications that the classifier may reliably distinguish. Increasing the quantity of parameters or layers of a machine-learning model may also increase the processing costs of executing the model (e.g., processing load, execution time, training time, etc.), which may prevent the machine-learning model from being operable under certain conditions (e.g., such as real-time operations, etc.).

Methods and systems are described herein for machine-learning model selection for discrete processing tasks. Multiple small machine-learning models may be instantiated and trained in place of a large machine-learning model to process an input dataset. Since each small machine-learning model may include fewer parameters or layers than the large machine-learning model, the small machine-learning model may be configured to achieve the same degree of accuracy as the large machine-learning model for portions of a given input dataset. Each small machine-learning model may be configured to process a particular input dataset (e.g., a dataset comprising particular characteristics, etc.) or may be configured to generate a particular output (e.g., such as a subset of the possible outputs that the large machine-learning model may be configured to generate, etc.). Together, the multiple small machine-learning model may be configured to process the same input datasets that the large machine-learning model is configured to process at similar accuracy and/or loss as the large machine-learning model. Yet, the small machine-learning model, having fewer parameters or layers than the large machine-learning model, may be more efficient to operate (e.g., use fewer processing resources to store and/or execute, smaller training datasets to train, faster training time, etc.).

For example, a large classifier may be configured to classify input images according to a number of different categories based on objects within the input images. A first small machine-learning model can be instantiated to classify input images according to a subset of the different categories and a second machine-learning model can be instantiated to classify the input images according to the remaining different categories. Alternatively, or additionally, a first machine-learning model can be instantiated to classify input images featuring natural lighting (e.g., daylight, etc.) and a second machine-learning model may be instantiated to classify input images featuring synthetic lighting (e.g., a flash, incandescent, fluorescent, etc.).

In some examples, a large machine-learning model may be compressed into a small machine-learning model. Compressing the machine-learning model may reduce the quantity of parameters or layers, which may make the compressed machine-learning suitable for processing a portion of the input datasets that the large machine-learning model would be capable of processing. Once compressed, the multiple small machine-learning models may be instantiated by training the compressed machine-learning model using different training datasets. Each small machine-learning model may be trained to process a range of input datasets that the corresponding large machine-learning model would have been expected to process.

Once trained, the large machine-learning model and multiple small machine-learning models may be used to process input datasets. For arbitrary input datasets, a model selector may determine which machine-learning model (from among the large machine-learning model and the multiple small machine-learning model) should process a particular input dataset. In some examples, the model selector may sample an input dataset to generate a test feature vector that can be passed as input into the machine-learning models to generate a corresponding test output. For deep learning networks (DNN), one or more initial layers of the DNN may operate as a feature extractor. The test output from the large machine-learning model may be labeled as pseudo ground truth (e.g., assumed to be true). The model selector may then compare the test output from each small machine-learning model to the test output from the large machine-learning model. In some instances, the model selector may use an accuracy metric or loss function (e.g., accuracy, precision, area under the curve, logarithmic loss, F1 score, weighted human disagreement rate, cross entropy, mean absolute error, mean square error, etc.). The model selector may identify a particular small machine-learning model of the multiple small machine-learning models that has a highest accuracy metric or lowest loss (per the loss function). The model selector may then use the particular small machine-learning model to process the rest of the particular input dataset.

In an illustrative example, monocular depth estimation may be performed by one or more machine-learning models such as deep neural networks (DNNs), or the like for various computer vision operations such as, but not limited to classification, semantic segmentation, object detection, instance segmentation, depth estimation, etc. (e.g, such as for automated driving for driverless cars, virtual reality, augmented reality, three-dimensional simulations, target acquisition, etc.). A computing device may instantiate (define and train) a large DNN to process various images, video frames, or video segments to generate depth maps or inverse depth maps using monocular depth estimation. Depth maps may represent each pixel of an image as a distance (e.g., a real number) between the location in an environment represented by the pixel and a camera. Multiple small DNN's may also be trained to process the various input images, video frames, and/or video segments. In some instances, each multiple small DNN may be generated by compressing the large DNN and training the compressed large DNN.

The computing device may receive a plurality of images. The plurality of images may be distinct images, images extracted from video frames, images extracted from a video segment, or the like. The images may be received from a content delivery network, a client device, another computing device, a camera (e.g., such as a live camera stream or previously stored images from captured from a camera), a server, etc. Alternatively, the computing device may receive images by extracting the images from a video segment stored in memory of the computing device.

The computing device may select one or more images from the plurality of images. In some instances, the computing device sample of the plurality of images to derive the one or more images.

The computing device may process the one or more images using the large DNN to generate a first predicted result that corresponds to the output of the large DNN. For example, the computing device may generate a feature vector using the one or more images that may be passed as input into the large DNN. The large DNN may process the feature vector and output the first predicted result (e.g., a depth map or reverse depth map, etc.). In some examples, the computing device may consider the first predicted result as pseudo ground truth.

The computing device may process the one or more images using the plurality of small DNNs to generate additional predicted results. For example, a first small DNN may process the one or more images to generate a second predicted result and a second small DNN may process the one or more images to generate a third predicted result, etc. Each of the small DNNs may be smaller than the large DNN (e.g., fewer parameters and/or layers, etc.).

The computing device may select, a small DNN from the plurality of small DNNs based on a comparison of the first predicted result with the second predicted result, the third test data set, etc. In some instances, the computing device may compare the second predicted result, the third predicted result, etc. relative to the first predicted result using one or more accuracy metrics and/or loss functions. For example, since the predicted results included a depth map or reverse depth map (e.g., representing each pixel as a real number distance from the camera), a loss function may be used to determine a difference between the first predicted result (which is labeled as pseudo ground truth) and the second predicted result, the first predicted result and the third predicted result, etc. Examples of loss functions include, but are not limited to, mean square error, mean absolute error, cross entropy, weighted human disagreement rate (WHDR), combinations thereof, or the like. The computing device may select the particular small DNN that has a highest accuracy metric, lowest error, lowest loss, etc.

The computing device may then process the plurality of images using the particular small DNN to generate depth maps or reverse depth maps from the plurality of images. In some instances, the computing device may process each of the plurality of images. In other instances, the computing device may process a portion of the plurality of images by sampling the plurality of images. For example, the computing device process every $n^{th}$ image of the plurality if images.

In some examples, the model selection process may be repeated to ensure the particular small DNN is still the most efficient small DNN to process the plurality of images. The model selection process may be re-executed in regular time intervals, upon detection of an event, upon detecting user input, after a predetermined quantity of instances in which the particular small DNN is executed, upon detecting a change in one or more characteristics of the plurality of images (e.g., such as a change in average pixel values, etc.), combinations thereof, or the like. The computing device may continuously ensure the most efficient small DNN is used to process the plurality of images.

The model selection process can be applied to a various machine-learning models to determine an efficient way to process disparate datasets. As such, the techniques described herein can be applied to deep neural networks (as previously described) as well as any other type of machine-learning model.

FIG. 1 illustrates a block diagram of an example system for selecting machine-learning models configured to process disparate datasets according to aspects of the present disclosure. Computing device 104 may be configured to process disparate datasets for proximate devices (e.g., such as devices operating within a same network) and/or remote devices (e.g., such as devices operating within other networks, etc.). Computing device 104 may include CPU 108, memory 112 (e.g., volatile memory such as random-access memory, etc. and non-volatile memory such as a flash, hard-disk drives, etc.), input/output interface 116, network interface 120, and data processor 124 connected via a bus, or the like. In some implementations, computing device 104 may include additional or fewer components.

Input/output interface 116 may include one or more hardware and/or software interfaces configured to receive and/or transmit data to one or more devices 132 connected to computing device 104 such as, but not limited to, display devices, keyboard and mouse, sensors, peripheral devices, media streaming devices, augmented reality devices, virtual reality devices, and/or the like. In an illustrative example, a first device of one or more device 132 may be a virtual reality display device configured to project a three-dimensional representation of media (e.g., video, video game, one or more images, etc.). If the media does not include three-dimensional data (e.g., the media is in two-dimensions, etc), then computing device 104 may execute monocular depth estimation using data processor 124 to generate depth maps from which a three-dimensional representation of the media can be generated. Computing device 104 may then transmit the three-dimensional representation of the media to a virtual-reality display via input/output interface 116. One or more device 132 may be connected to input/output interface 116 through a wired connection (e.g., universal serial bus (USB) type A, B, or C; high-definition multimedia interface (HDMI); digital visual interface (DVI); DisplayPort; etc.) or wireless connection (e.g., such as, but not limited to, Wi-Fi, Bluetooth, Zigbee, Z-wave, infrared, ultra-wide band, etc.).

Network interface 120 may enable connections to one or more remote devices through network 128 (e.g., the Internet, local area network, wide-area network, cloud network, etc.). In some examples, computing device 104 may receive request to process data using data processor 124 through network interface 120. Once received, computing device 128 may store the data in memory 112, process the data using data processor 124, and transmit the output to the requesting device (or one or more other devices) through network 128. Alternatively, or additionally, the output may be presented through one or more devices 132. In some examples, data processor 124 may process received data in real time. In those examples, data processor 124 may process streamed data (received via network interface 120 or input/output interface 116) as its received or may store a portion of the stream in a buffer in memory 112 and process the portion of the streamed data stored in the buffer each time the buffer is full.

In some implementations, data processor 120 may be an independent component of computing device 104 connected to CPU 108, memory 112, input/output interface 116, and network interface 120, via the bus. Data processor 120 may be configured to operate within computing device 104 or may operate independently from computing device 104. For example, data processor 120 may be application-specific integrated circuit, field programmable gate array, mask programmable gate array, microcontroller, or the like configured to process instructions stored in memory of data processor 12. Alternatively, data processor 120 may be non-volatile memory (as an independent component connected to the bus or a subcomponent of memory 112) storing instructions configured to process various datasets. The instructions may be executed by CPU 108 (and/or other components of computing device 104).

Data processor 124 may include model selector 136 configured to select a particular machine-learning model to process a particular dataset, feature extractor 140 configured to generate an input feature vector for a selected machine-learning model (e.g, for models that may not needing an external feature extractor), training data 144 storing training data for the machine-learning models, large machine-learning model 148, and one or more small machine-learning models (e.g., such as small ML model 1 152 through small ML model n 156 where n may be any integer greater than 1).

Data processor 124 may process various types of datasets using two or more machine-learning models. The two or more machine-learning models may be of varying sizes allowing data processor 124 dynamically select the most efficient machine-learning model to process a given dataset or to dynamically switch to a different machine-learning model based on the current status of data processor 124 and/or computing device 104. The two or more machine-learning models may include a large machine-learning model (e.g., a machine-learning model with a quantity of parameters or layers that are greater than a threshold) and one or more small machine-learning models model (e.g., a machine-learning model with a quantity of parameters or layers that are less than the threshold).

The size of a machine-learning model (e.g., the quantity of parameters, the quantity of layers of a neural network, etc.) may indicate the learning potential of the machine-learning model. A large machine-learning model may be trained to process general datasets (e.g., datasets that may not correspond to any taxonomy or that may not have any particular shared characteristics). For example, a large image classifier trained to classify objects within images may be able to classify a random sampling if input images (e.g., daylight, indoors, nighttime or low light, the to-be-classified object being obscured or far away from the camera, the to-be-classified object being clear and close to the camera, etc.). A small machine-learning model may have a lower accuracy and/or a higher loss when classifying particular types of images. For instance, a small image classifier trained to classify objects within images may be able to classify images sharing particular characteristics (e.g., such as images taken during the day or with a lot of light) and may have a lower accuracy or higher loss when classifying images with different characteristics (e.g., such as images captured a nighttime or in low-light conditions, etc.).

Large machine-learning models may have a larger memory footprint and may use more processing resource (e.g., CPU 108, cache or volatile memory, non-volatile memory, bandwidth, etc.) than corresponding small machine-learning models. Large machine-learning models may also have different training time intervals than small machine-learning models and execute over longer time intervals making the use of large machine-learning models more complex for time-sensitive operations.

Machine-learning models 148-156 may be any type of machine-learning model including, but not limited to, neural networks, deep neural networks, transformers, classifiers, support vector machines, decision trees, etc. In some examples, machine-learning models 152-156 may be generated by compressing large machine-learning model 148 (before, during, or after large machine-learning model 148 is trained). In those examples, large machine-learning model 148 can be compressed by pruning (e.g., removing unnecessary parameters or layers, etc.), quantization (e.g., reducing memory footprint of parameters, etc.), knowledge distillation (e.g., training the small machine-learning model to simulate the large machine-learning model), low-rank factorization, etc.

Large machine-learning models 148 may be trained and/or compressed by data processor 124. If one or more small machine-learning models 152-156 may generated through compression of large machine-learning model 148 and/or trained by data processor 124. Model selector 136 may determine, for a selected processing task, a type of machine-learning model that is to execute the process task. Model selector 136 may pass a training request to feature extractor 140. Feature extractor 140 may generate training datasets to train the type of machine-learning model that is to execute the processing task. Data processor 124 may train machine-learning models using training data stored in training data 144, generated (e.g., procedurally generate by feature extractor 140 or received from user input), or received from one or more remote devices (e.g., one or more devices 132, one or more remote devices connected via network 128, etc.) to perform one or more operations. Training data 144 may store data configured to train machine-learning models to process a particular type of input data. For example, training data 144 may store image data such that machine-learning models can be trained to process images (e.g., generate depth maps, classify images, detect objects, etc.). Training data 144 may also store historical data (e.g., data associated with historical executions of machine-learning models 148-156, etc.), generated data, received data, etc.). If one or more small machine-learning models 152-156 are to be trained independently from large machine-learning model 148, feature extractor 140 may generate training sets for the one or more small machine-learning models 152-156 based on the type of machine-learning model and size of the machine-learning model to be trained. The training datasets used to the one or more small machine-learning models 152-156 train may be similar to or the same as the training datasets used to train large machine-learning model 148.

Feature extractor 140 may train machine-learning models 148-156 using the training datasets. Machine-learning models 148-156 may be trained over a predetermined time interval, for a predetermined quantity of iterations, until a target accuracy metric is reached, until a target loss value (from one or more loss functions) is reached, etc.

Data processor 124 may receive a dataset to process using one or more of the trained machine-learning models 148-156. The dataset may be received via input/output dataset 116, network interface 120, or stored in memory 112. The dataset may be a discrete dataset (e.g., a definite size and/or length, etc.) or may be a continuous stream (e.g., such as a broadcast media, video game, or other media of indefinite size or length, etc.). Model selector 136 may determine which of machine-learning models 148-156 would be most efficient to process the received dataset (or a portion thereof) by sampling the dataset, processing the samples using the machine-learning models, and determining through a comparison of the results which machine-learning model should process the dataset.

Model selector 136 may sample the dataset by extracting a portion of the dataset. Model selector 136 may sample an initial portion of the dataset (e.g., the first quantity of bits, the first quantity of images or video frames, the first predetermined seconds of audio, etc., etc.). Alternatively, or additionally, model selector 136 may obtain a random sample of the dataset by, for example, using a random number generator to randomly select a portion of the dataset. Model selector 136 may send an identification of samples and an indication as to which machine-learning models are to be utilized to feature extractor 140.

Feature extractor 140 may generate feature vectors for the selected machine-learning models (e.g., large machine-learning model 148 and one or more machine-learning models 152-156 that do not include internal feature extraction functionality, etc.). Large machine-learning model 148 may execute using the feature vector from feature extractor 140 and generate a first output (e.g., a first predicted result). Small machine-learning model 1 152 through small machine-learning model n 156 may also execute using the same feature vector (or a feature vector tailored by feature extractor 140 for the respective small machine-learning model) to generate a second output (e.g., a predicted result from small machine-learning model 1 152) through nth output (from small machine-learning model n 156, etc).

Model selector 136 may compare the first output with the second output through nth output to determine which of the small machine-learning models should be processing the dataset. For example, the model selector 136 may label the first output as ground truth and then measure the accuracy and/or loss of first output through the nth output using the first output to determine the accuracy (e.g., using an accuracy metric, etc.) and/or loss (e.g., using a loss function, etc.) of each small machine-learning model 152-156 relative to the large machine-learning model 148 for the particular dataset. Model selector 136 may select the small machine-learning model 152-156 that has a highest accuracy and/or lowest loss. Alternatively, model selector 136 may measure the second output through nth output relative to the first output and/or relative to the second output through nth output creating a distribution of relative outputs (e.g., second output relative to a third output, second output relative to a fourth output, second output relative to the nth output, etc.) from which a particular output can be selected as a preferable output over the other outputs. The small machine-learning model corresponding to the particular output may then be selected to process the dataset. Alternatively, model selector 136 may measure each output of the second output through nth output independently from other outputs to determine the small machine-learning model that should process the dataset. In that instance, large machine-learning model 148 may not be used (e.g., may not generate the first output, etc.) Model selector 136 may use any accuracy metric and/or loss function to measure outputs relative to other outputs.

Alternatively, model selector 136 may determine to process the dataset using large machine-learning model 148 rather than small machine-learning models 152-156. Model selector 136 may determine small machine-learning models 152-156 may have accuracy metrics less than a first threshold and/or loss functions that are greater than a second threshold. As a result, model selector 136 may select large machine-learning model 148 would be the most efficient machine-learning model to process the dataset. Model selector 136 may select machine-learning models by balancing processing efficiency (e.g., for which small machine-learning models 152-156 may be more efficient by using fewer processing resources) and accuracy (for which large machine-learning model 148 may sometimes be more accurate than small machine-learning models 152-156).

Model selector 136 may select small machine-learning model as long the accuracy of the selected small machine-learning model relative to large machine-learning model 148 1) is greater than the other small machine-learning models being considered and 2) is greater than the first threshold. Examples of accuracy metrics and/or loss functions include, but are not limited to accuracy, precision, area under the curve, logarithmic loss, F1 score, weighted human disagreement rate, cross entropy, mean absolute error, mean square error, or the like. Model selector 136 may begin processing the rest of the dataset using the small machine-learning model with the highest accuracy and/or lowest loss.

In some instances, model selector may execute the machine-learning model selection process again during processing of the data set to ensure that the selected small machine-learning model is still the most efficient machine-learning model to process the dataset. For example, data processor 124 may be processing a video stream to generate estimated depth maps of each video frame (or every nth frame, etc.). The first few video frames of the video stream may correspond include high-light conditions for which small machine-learning model 1 152 is shown to be the most efficient (based on an execution of the aforementioned model selection process). A subsequent portion of the video stream may include video frames including low-light conditions for which small machine-learning model 1 152 may not be the most efficient (e.g., small machine-learning model 1 152 may have a lower accuracy and/or higher loss when process low-light video frames). Model selector 136 may re-execute the model selection process using one or more recently recent inputs to small machine-learning model 1 152 and select large machine-learning model 148 and/or one of small machine-learning model 2 (not shown) through small machine-learning model n 156 to take over processing the video stream.

The model selection process may be re-executed in regular intervals (e.g., very n video frames, every n seconds, etc.), upon detecting an event, upon receiving user input, detecting a change in one or more characteristics of the portion of the dataset being input to the selected small machine-learning model (during particular iteration) and/or the output from the selected small machine-learning model (e.g., such as a change in average pixel values in the previous example, etc.), accuracy metrics and/or loss functions, combinations thereof, or the like. Model selector 316 may continuously monitor the execution of the selected small machine-learning model for a given dataset to ensure the most efficient small machine-learning model is being executed.

Figure 2:
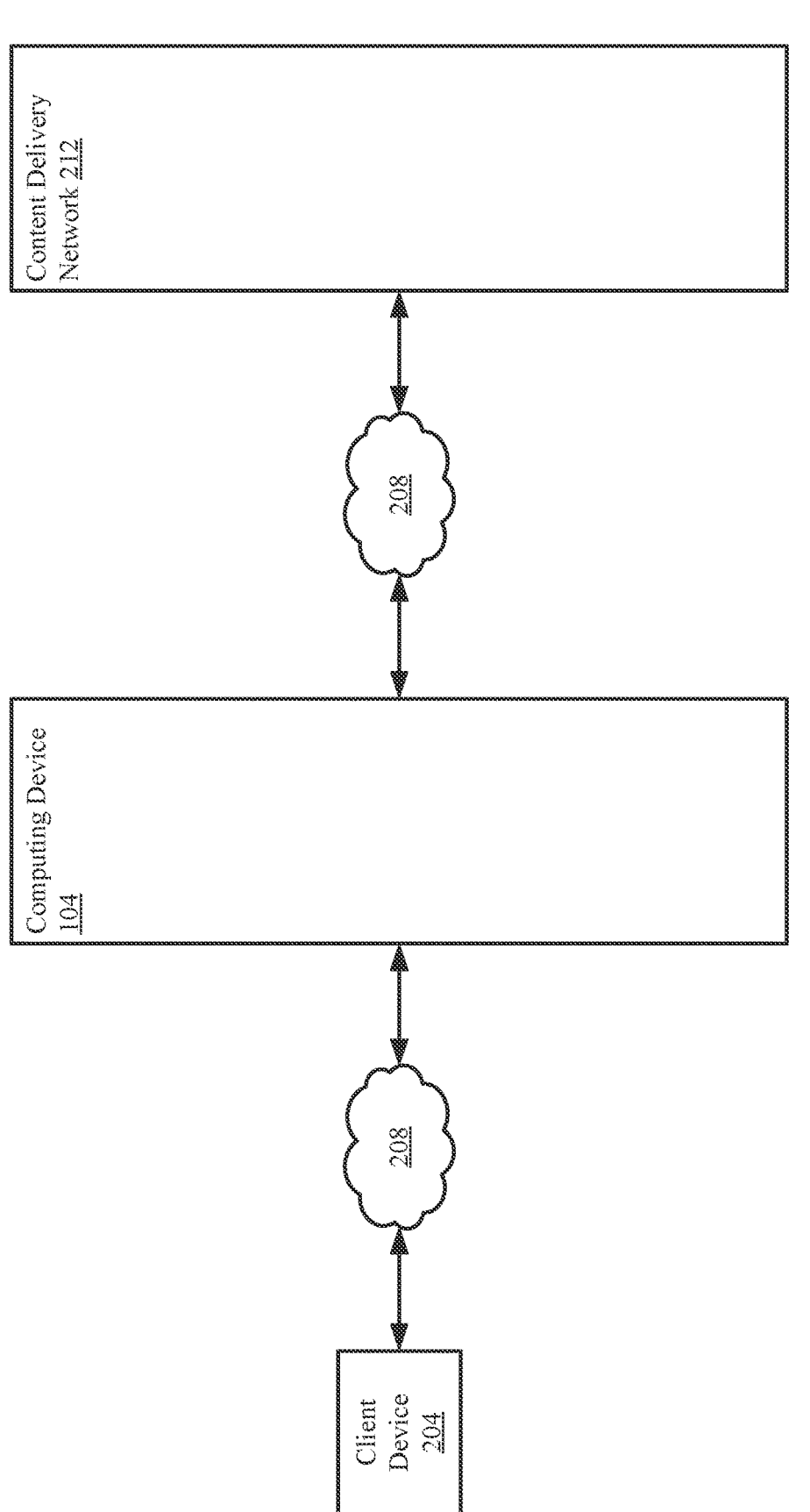
FIG. 2 illustrates an example media processing system according to aspects of the present disclosure.

FIG. 2 illustrates an example media processing system according to aspects of the present disclosure. In some instance, computing device 104 may operate as a load balancer by providing processing services to one or more client devices such as client device 204. For example, client device 204 may be any processing device such as, but not limited to, desktop or laptop computer, mobile device (e.g., such as smartphone, tablet, etc.), video game console, server, etc. Client device 204 may operate a processing intensive application. Client device 204 may use the resources of computing device 104 by transmitting and/or streaming datasets to computing device 104. Computing device 104 may use data processor 124 to select a small machine-learning model configured to process the datasets to generate an output (or output stream). Computing device 104 may transmit (or stream) the output back to client device 204.

In other instances, computing device 104 may process datasets that cannot be processed locally by client device 204. For instance, computing device 204 may operate a virtual reality application configured to present a three-dimensional representation of various media (e.g., movie, video game, simulations, etc.). Computing device 204 may receive content associated with the virtual reality application from content delivery network 212 through network 208. In another instance, computing device 204 may receive images from a live camera feed (or images aggregated from a live camera feed), If the content is not already in a three-dimensional representation, computing device 104 use monocular depth estimation to convert the content into a three-dimensional representation. Monocular depth estimation is a process for determine an approximate distance between surfaces represented in an image (or video frame) and the camera that took the image. In some instances, monocular depth estimation may be performed for each pixel in an image (or video frame) generating a depth map. The distances may be used to generate a three-dimensional representation of a two-dimensional image. The three-dimensional representation may be used for computer vision such as augmented reality, virtual reality, 3D televisions, video games, map three-dimensional environments, simulations, vehicle automation such as driverless cars, etc.

Computing device 104 may receive a request for three-dimensional content from client device 204. Computing device 104 may request the content from content delivery network 212 and process the content (in real-time). In some examples, computing device 104 may transmit the content and the depth maps generated by a data processor of computing device 104 (e.g., such as data processor 124, etc.) to client device 204. Client device 204 may use the content and the depth maps to generate three-dimensional representation of the content for the virtual reality application. Alternatively, client device 204 may receive the content directly from content delivery network 212 and the depth maps from 104. Each depth map may be associated with metadata indicating a location of the content that corresponds to the depth map. In other examples, computing device 104 may generate the three-dimensional representation of the content and transmit or stream the three-dimensional representation of the content to client device 204. For example, client device 204 may connect to computing device 104 and stream various three-dimensional representations of content from content delivery network generated by computing device 104.

Figure 3:
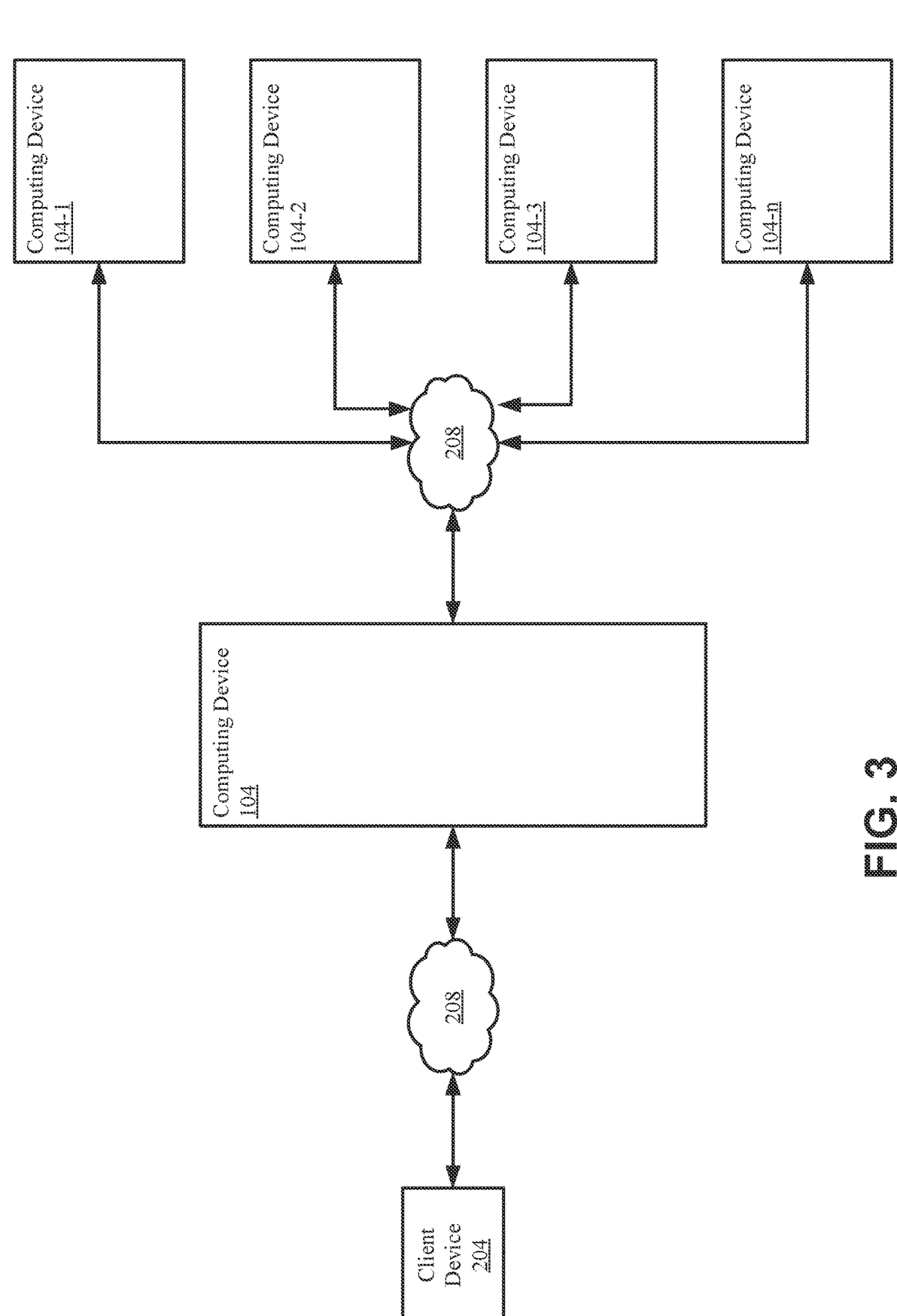
FIG. 3 illustrates a block diagram of an example distributed data processing network according to aspects of the present disclosure.

FIG. 3 illustrates a block diagram of an example distributed data processing network according to aspects of the present disclosure. Computing device 104 may operate in a distributed network configured to provide processing services to one or more device such as client device 204, other devices, servers, networks, etc. Computing device 104 may include data processor 124 configured to process various datasets. Data processor 124 may use a model selection process on a large machine-learning models and one or more small machine-learning models to determine the most efficient machine-learning model to use when processing particular datasets. The small model selection process may balance reduce processing load of computing device 104 and an achieving an overall accuracy when selecting the machine-learning model that will process the particular datasets. In some examples, computing device 104 may operate a plurality of large machine-learning models and a plurality of corresponding one or more small machine-learning models to enable parallel processing of similar and/or disparate datasets.

In some instances, computing device 104 may operate as a node in a distributed data processing network. Any number of additional computing devices (e.g., computing device 104-1, computing device 104-2, computing device 104-3, computing device 104-$n$, etc.) may also operate in the distributed data processing network. Each computing device of computing devices 104 and 104-1-104-$n$ may include a data processor (e.g., such as data processor 124) with a large machine-learning model, one or more small machine-learning models and a model selector configured to identify the most efficient small machine-learning model capable of processing a given dataset with a threshold accuracy and/or loss.

Computing device 104 may also include a load balancer configured to identify a particular computing device capable of processing particular dataset. For instance, client device 204 may transmit a request to computing device 104 with an identification of a particular dataset to process. Load balancer may select a computing device from computing device 104 and computing devices 104-1 through 104-$n$ capable of processing the particular dataset. Load balancer may use one or more features of the particular dataset and the computing devices 104 and computing devices 104-1 through 104-$n$ to select a computing device such as, but not limited to, the processing load of each respective computing device, a data type of the particular dataset, an expected output, data types capable of being processed by the respective computing device, network bandwidth, transmission paths (e.g., for transmitting the particular dataset to each respective computing device and for transmitting the output back to the client device 104, etc.), the accuracy and/or loss of the machine-learning models configured to process the particular dataset (as determined using the model selection process as previously described), combinations thereof, or the like. In some examples, the one or more features may be weighted with the weights being continuously adjusted based on the status of the distributed data processing network. For example, features corresponding to the capabilities of a computing device based on the particular dataset may be weighted high to ensure the selected computing device is capable of processing the particular dataset (e.g., if the particular dataset includes image data, the small machine-learning model of the selected computing device is trained to process image data, etc.). Other features to balance the processing load across the distributed data processing network.

In some instances, a dataset may be processed by more than one computing device. For example, a large dataset or media stream may be processed in discrete sections (e.g., each image or video frame, each n second chunk, each n bits of data, etc.). Computing device 104 may generate a sequence of feature vectors. Alternatively, for real-time operations, computing device may generate features vectors as the data is received by computing device. Each feature vector may be associated a sequential identifier that indicates the portion of the dataset that the feature vector was derived from Computing device 104 may then transmit the feature vector to a computing device selected by the load balancer to process the feature vector and generate an output. The output from the selected computing device may be received by computing device 104 along with an identification of the feature vector and/or the sequential identifier. Computing device 104 may then assemble the outputs received from the computing devices processing the dataset into an output sequence (when processing non-real time data) or transmit each output to client device 204 as the outputs are generated. By distributing the dataset across computing devices of the distributed data processing network, computing device 104 may reduce processing loads of the distributed data processing network, reduce processing latency by processing portions of datasets in parallel, maintain an accuracy of the dataset being processed, etc.

In other instances, computing device 104 may transmit a selected small machine-learning model to client device 204 to enable client device 204 to process datasets locally. In those instances, the data processor of computing device 104 may execute a model selection process using a sample of the dataset to identify a particular small machine-learning model capable of processing the dataset at a threshold accuracy or loss (as previously described). Computing device 104 may then transmit the selected small machine-learning model to client device 204. Client device may process the rest of the dataset using the selected small machine-learning model.

Figure 4:
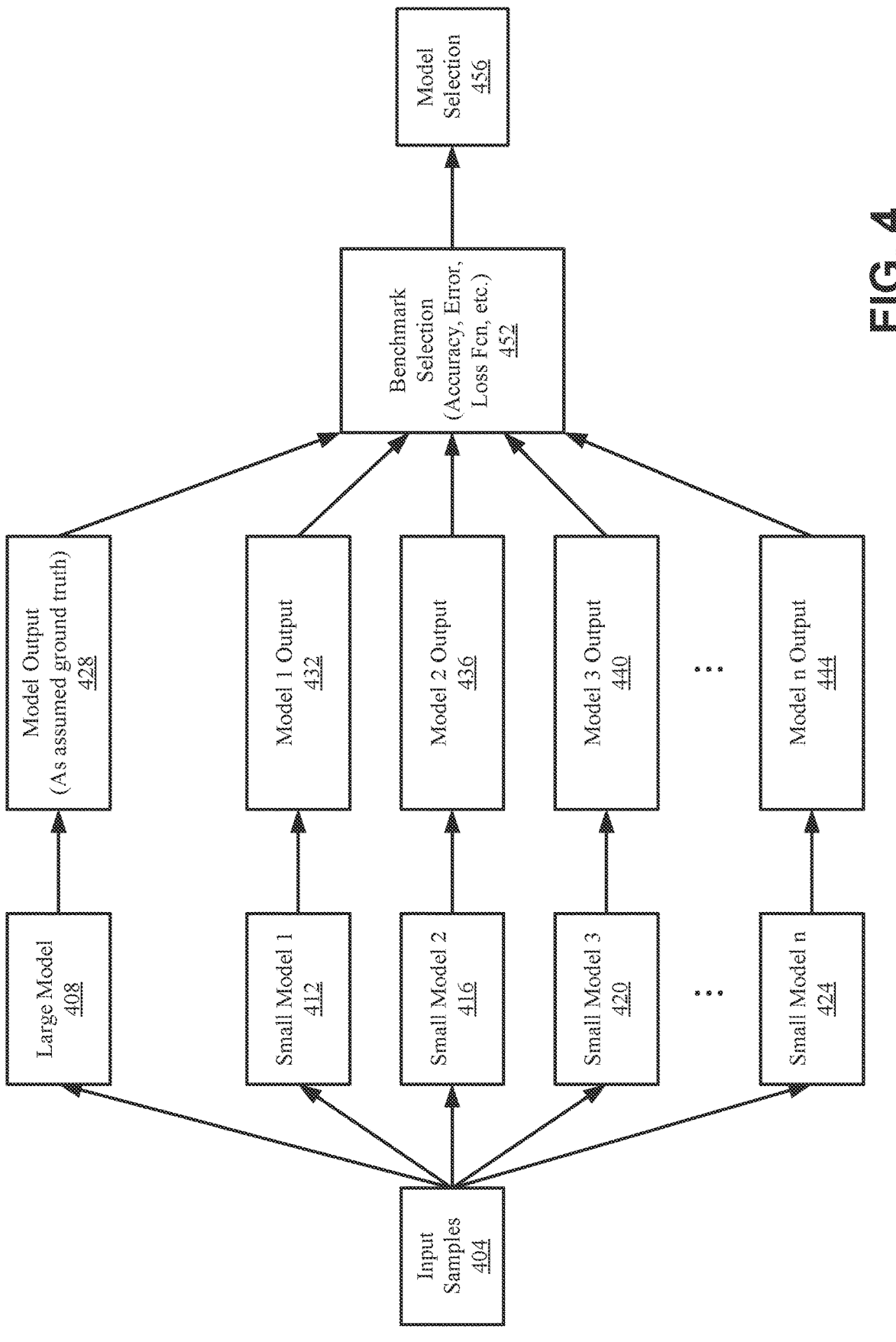
FIG. 4 illustrates a block diagram of an example model selection process for selecting a small machine-learning model for processing a dataset according to aspects of the present disclosure.

FIG. 4 illustrates a block diagram of an example model selection process for selecting a small machine-learning model for processing a dataset according to aspects of the present disclosure. The model selection process may identify a particular machine-learning model to be used to process a given dataset. Large machine-learning model 408 (e.g., with quantity of parameters and/or layers that is greater than a threshold) may be trained to process general datasets. The large machine-learning model 408 may be compressed to generate one or more small machine-learning models (e.g., small model 1 412, small model 2 416, small model 3 420, small model n 424, etc.). Large machine-learning model 408 may be compressed before, during, or after training. Large machine-learning model 408 can be compressed by pruning (e.g., removing unnecessary parameters or layers, etc.), quantization (e.g., reducing memory footprint of parameters, etc.), knowledge distillation (e.g., training the small machine-learning model to simulate the large machine-learning model), low-rank factorization, or by any other compression algorithm. Alternatively, the one or more small machine-learning models may be independently defined and trained. Any number of small machine-learning models may be generated (through compression or through independent training) with n being any integer greater than 1.

When a request to process a particular dataset is received, the model selection process may begin. The particular dataset may be sampled to generate one or more discrete portions of the dataset that can be processed by machine-learning models 408-424. One or more feature vectors may be derived from each of the one or more discrete portions of the dataset. In some instances, a single feature vector may be derived for machine-learning models 408-424. In other instances, a feature vector may be derived for each machine-learning model that may be tailored to the machine-learning model (e.g., based on the quantity of parameters and/or layers of the model, etc.). Each machine-learning model 408-424 may be executed using the one or more feature vectors to generate a respective model output. Large machine-learning model 408 may process the feature vector to generate model output 428. Small machine-learning model 1 412 may process the feature vector to generate model 1 output 432 and small machine-learning model n 424 may process the feature vector to generate model n output 444, etc.

At benchmark selection 452, one or more benchmarks may be selected to evaluate model outputs 428-444. Benchmark selection 452 may designate the model output from large machine-learning model 408 (e.g., model output 428) as ground truth and compare model outputs from small machine-learning models 412-424 (e.g., model output 432-444) relative to model output 428.

In some instances, the benchmark selection may determine the benchmark based on the data type of model output 428-444. For example, the benchmark for classifiers may be an accuracy metric or an error metric that evaluates the output according to a Boolean value (e.g., true/false or correct/incorrect, etc.). The benchmark for machine-learning models that output numerical outputs (e.g., such as a depth estimation machine-learning model, which may output a depth map or reverse depth map, etc.) may be an error function (e.g., that determines a difference between the ground truth and the output). Benchmark selection 452 may use one or more benchmarks when evaluating outputs 428-444.

In some examples, for outputs that include depth maps benchmark selection 452 may use weighted human disagreement rate, mean absolute relative error, or the like. Weighted human disagreement rate uses equal weights (e.g., set to 1) and identifies for each pixel of the output depth map whether the pixel is closer to or farther from the corresponding pixel of the ground truth model output 428. Each pixel of the model output can replace each pixel with a 0 (indicating the pixel of the model output closer than the corresponding pixel of the ground truth depth map) or a 1 (indicating the pixel of the model output further than the corresponding pixel of the ground truth depth map). The distribution of 0's and 1's can be used to evaluate the degree in which the model output depth map deviated from the ground truth. Mean absolute relative error may evaluate the error using $$\frac{1}{M}\sum_{k=0}^{M}\frac{|z_i - z_i^*|}{z_i^*}$$

where $z_i$ corresponds to the value of pixel I on the depth map being evaluated, $$z_i^*$$

corresponds to the ground trough value of pixel i of the ground truth depth map 428 and M corresponds to the total quantity of pixels of the depth map.

A loss function L may be represented using $d_i$ representing a predicted disparity (between the ground truth and the model output for a given pixel), $$d_i^*$$

representing the ground truth of that pixel from the ground truth model output, M representing the quantity of pixels in the depth map. An example of loss function L includes, but is not limited to, a mean square loss defined by $$L_2(d_i, d_i^*) = \frac{1}{M}\sum_{i}^{M}\|d_i - d_i^*\|^2$$

In other examples, any accuracy metric, loss function, error rate, or the like may be used to evaluate a model output relative to the ground truth model output. Examples of accuracy metrics and/or loss functions include, but are not limited to accuracy, precision, area under the curve, logarithmic loss, F1 score, weighted human disagreement rate, cross entropy, mean absolute relative error, mean square error, or the like.

Benchmark selection 452 may then identify the model output 432-444 with the highest accuracy or lowest loss. Model selection 456 may then select small machine-learning model from small machine-learning models 412-424 that corresponds to the identified model output. The selected small machine-learning model may be used to process the rest of the particular dataset.

Figure 5:
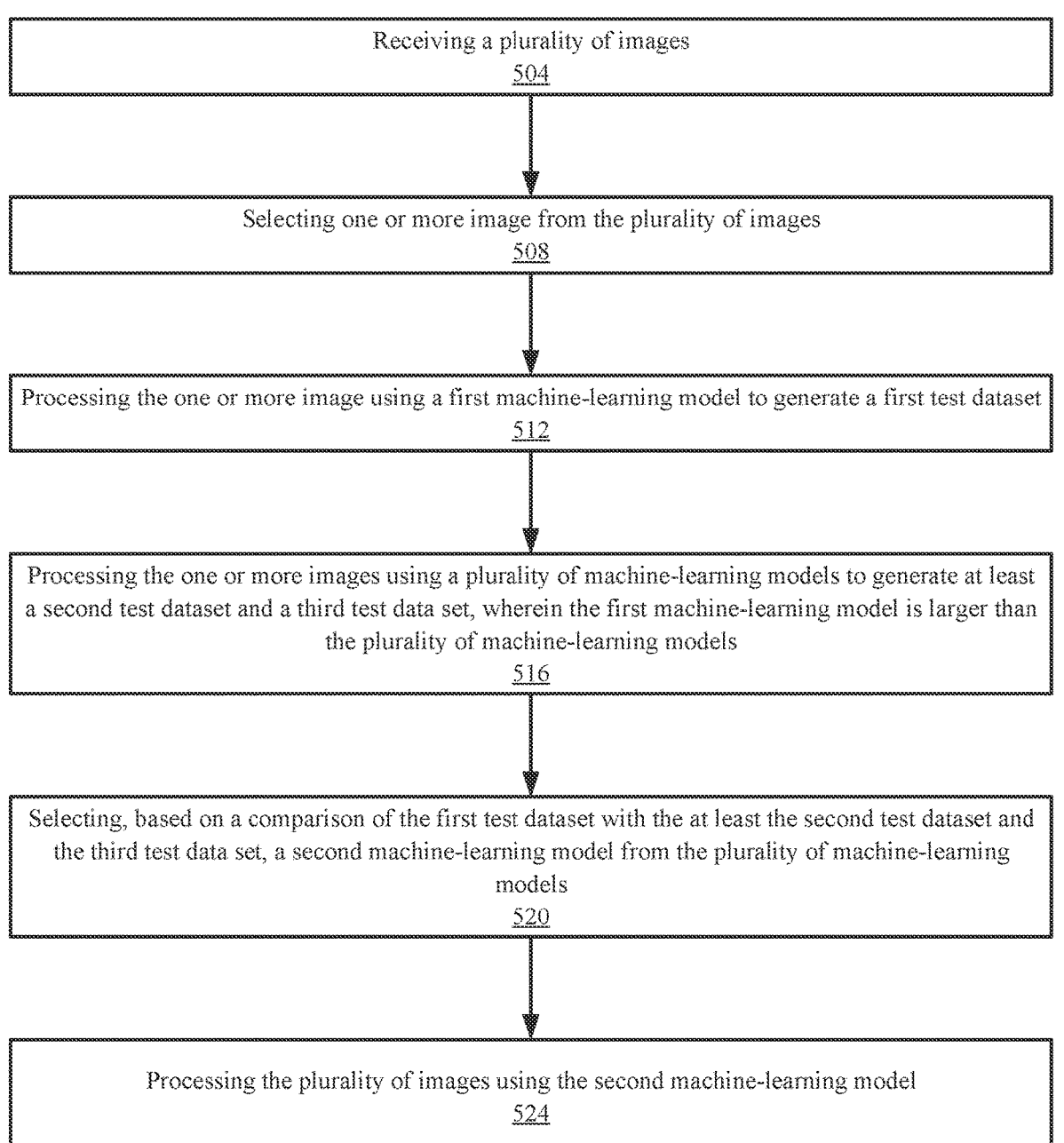
FIG. 5 illustrates a flowchart of an example process for model selection for monocular depth estimation according to aspects of the present disclosure.

FIG. 5 illustrates a flowchart of an example process for model selection for monocular depth estimation according to aspects of the present disclosure. Monocular depth estimation may be performed by one or more machine-learning models such as deep neural networks, or the like for various computer vision operations such as, but not limited to classification, semantic segmentation, object detection, instance segmentation, depth estimation, etc. (e.g., such as for automated driving for driverless cars, virtual reality, augmented reality, three-dimensional simulations, target acquisition, etc.). A model selection process may be executed to select an efficient machine-learning model based on processing resources consumed by the selected machine-learning model and the accuracy of the machine-learning model when processing a particular dataset.

For example, at block 504, a computing device may receive a plurality of images. The plurality of images may be independent images (not related to other images of the plurality of images, etc.), images extracted from video frames, images extracted from a video segment, or the like. The images may be received from a camera, content delivery network, a client device, another computing device, a server, etc. Alternatively, the computing device may receive images by extracting the images from a video segment stored in memory of the computing device or from a live camera stream. For live camera stream, images may be received continuously as the images are captured by a camera. The computing device is considered to have received the plurality of images upon receiving a first image from the live camera stream as additional images of the live camera stream will be received over time.

At block 508, the computing device may select one or more images from the plurality of images. For example, the computing device may sample the plurality of images to derive the one or more images. For live camera stream, the one or more images may correspond to the first one or more images received from the live camera stream. In some instances, the computing device may randomly sample the plurality of images. In other instances, the computing device may select the one or more images from the plurality of images according to one or more parameters. The one or more parameters may be based on the quantity and/or sequence of images of the plurality of images, characteristics of the images such as pixel values (e.g., average reg, green, blue, values and/or pixel luminance values, etc.), metadata associated with the plurality of images, combinations thereof, or the like. For example, the computing device may sample the plurality of images by selecting images evenly over the distribution of the plurality of images based on the quantity of images to be included in the sampling (e.g., such as the first and last image when sampling two images from the plurality of images, etc.).

At block 512, the computing device may process the one or more images using a first machine-learning model to generate a first predicted result. For example, the computing device may generate a feature vector using the one or more images. The feature vector may be passed as input into the first machine-learning model. The first machine-learning model may process the feature vector and output the first predicted result. The first machine-learning model may be a large machine-learning model. The large machine-learning model may be a machine-learning model with a quantity of parameters and/or layers that is greater than a threshold. In some examples, the computing device may label the first predicted result as pseudo ground truth usable to compare the output of other machine-learning models to the first predicted result.

At block 516, the computing device may process the one or more images using a plurality of machine-learning models to generate a second predicted result (e.g., using a first machine-learning model of the plurality of machine-learning models), a third predicted result (e.g., using a second machine-learning model of the plurality of machine-learning models), etc. The plurality of machine-learning models may be small machine-learning models. A small machine-learning model may include a quantity of parameters and/or layers that is less than the threshold. The first machine-learning may include more parameters and/or layers than the plurality of machine-learning models. The plurality of machine-learning models may be generated by compressing the first machine-learning model (e.g., using pruning, quantization, knowledge distillation, low-rank factorization, etc.) before, during, or after training the first machine-learning model. In some examples, the computing device determine whether to train the plurality of machine-learning models. The computing device may determine to train one or more of the plurality of machine-learning models using the same training data as used to train the first machine-learning model, similar training data as used to train the first machine-learning model, or different training data as used to train the first machine-learning model). Alternatively, the plurality of machine-learning models may be independently defined and trained (e.g., separately from the first machine-learning model). In those instances, the plurality of machine-learning models may be of a same, similar, or different type than the first machine-learning model (e.g., different models, different parameters, different types of layers, different algorithms, different training processes or iterations, etc.).

The computing device may use the same or a similar feature vector (derived from the one or more images) that was passed as input into the first machine-learning model to input into the plurality of machine-learning models to generate the second predicted result, third predicted result, etc. In other instances, the computing device may tailor the feature vector for the plurality of machine-learning models. Since the plurality of machine-learning models have fewer parameters and/or layers, the machine-learning models may accept fewer features in an input feature vector. The computing device may compress the feature vector (e.g., using any of the aforementioned compression techniques) to reduce the quantity of input features.

At block 520, the computing device may select a second machine-learning model from the plurality of machine-learning models based on a comparison of the first predicted result with the second predicted result the third test data set, etc. In some instances, the computing device may compare the second predicted result, the third predicted result, etc. relative to the first predicted result using one or more accuracy metrics and/or loss functions. For example, depth maps may represent each pixel of an image as a distance (e.g., a real number) between the location in an environment represented by the pixel and a camera. The computing device may do a pixel-wise comparison of each distance value of each pixel of the second predicted result relative to each corresponding pixel in the first predicted result (e.g., treated as being ground truth for purposes of comparison). A loss function may be used to determine to compare the second predicted result to the first predicted result, the third predicted result to the first predicted result, etc. Examples of loss functions include, but are not limited to, mean square error, mean absolute error, cross entropy, weighted human disagreement rate (WHDR), combinations thereof, or the like. The computing device may select a machine-learning model from the plurality of machine-learning model that has a highest accuracy metric, lowest error rate, lowest loss, etc. to process the plurality of images.

At block 524, the computing device may process the plurality of images using a second machine-learning model (e.g., the selected machine-learning model from block 520 with the highest accuracy or lowest loss, etc.). In some instances, the computing device may process each of the plurality of images. In other instances, the computing device may process a portion of the plurality of images by sampling the plurality of images (e.g., such as ever nth image, etc.). Returning to the monocular depth estimation example, the computing device may execute monocular depth estimation using the second machine-learning model and the plurality of images generating a sequence of depth maps from the plurality of images. Since the second machine-learning model is a small machine-learning model, the monocular depth estimation can be performed in approximately real time (e.g., using a live camera stream, dynamically or procedurally generated images from video games, etc.)

In some examples, the model selection process may be repeated to ensure the second machine-learning model is still the most efficient machine-learning model to process the plurality of images. The model selection process may be re-executed in regular time intervals, upon detection of an event, upon detecting user input, after a predetermined iterations of executing the second machine-learning model, upon detecting a change in one or more characteristics of the plurality of images (e.g., such as a change in average pixel values, etc.), combinations thereof, or the like. The computing device may continuously ensure the most efficient machine-learning model is used to process the plurality of images (e.g., the machine-learning model with the highest accuracy, lowest error rate, lowest loss, etc. when processing the plurality of images).

The model selection process can be applied to a various machine-learning models to determine an efficient way to process disparate datasets. As such, the techniques described herein can be applied to deep neural networks (as previously described) as well as any other type of machine-learning model or dataset.

Figure 6:
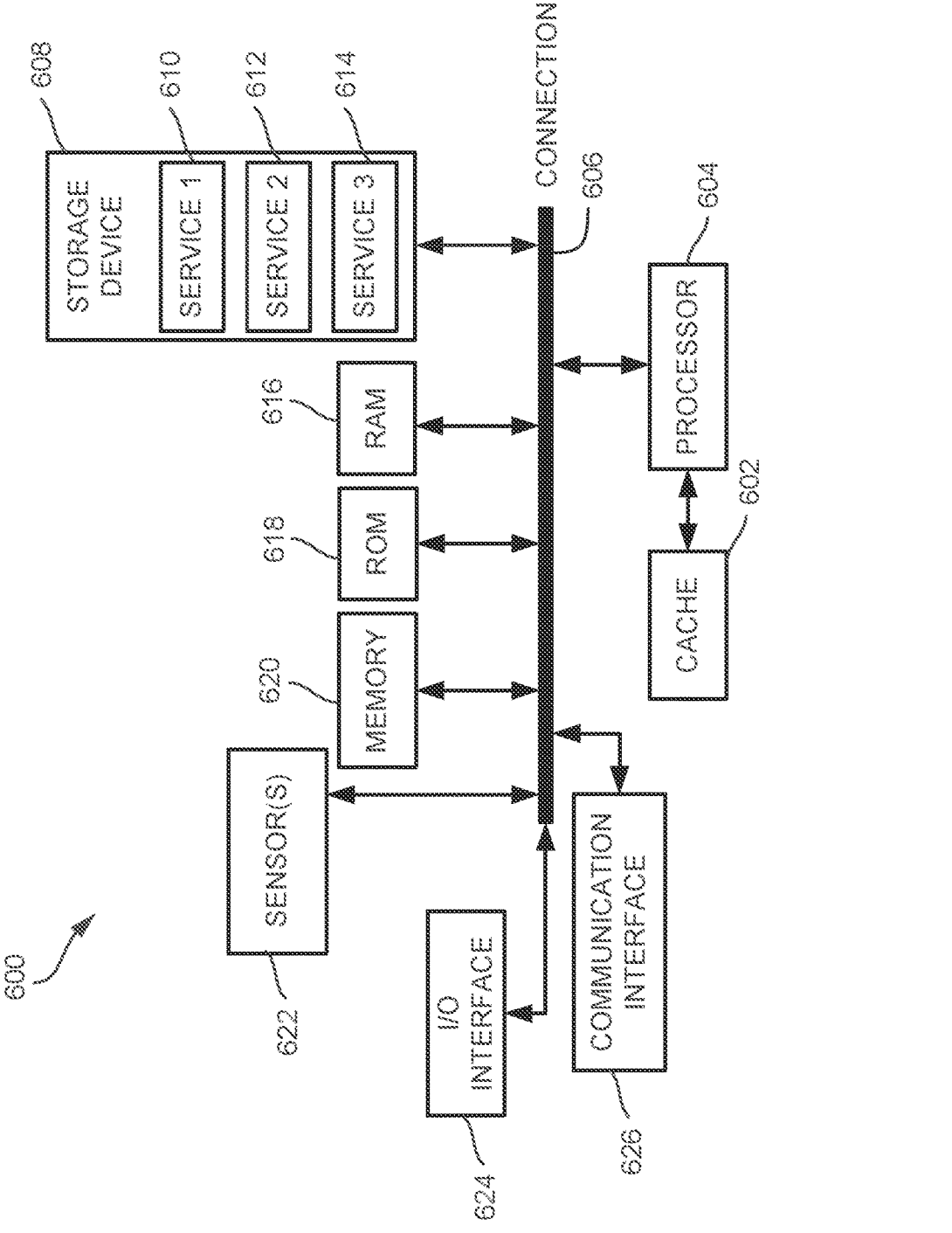
FIG. 6 illustrates an example computing device architecture of an example computing device that can implement the various techniques described herein according to aspects of the present disclosure.

FIG. 6 illustrates an example computing device according to aspects of the present disclosure. For example, computing device 600 can implement any of the systems or methods described herein. In some instances, computing device 600 may be a component of or included within a media device. The components of computing device 600 are shown in electrical communication with each other using connection 606, such as a bus. The example computing device architecture 600 includes a processor (e.g., CPU, processor, or the like) 604 and connection 606 (e.g., such as a bus, or the like) that is configured to couple components of computing device 600 such as, but not limited to, memory 620, read only memory (ROM) 618, random access memory (RAM) 616, and/or storage device 608, to processing unit 610.

Computing device 600 can include a cache 602 of high-speed memory connected directly with, in close proximity to, or integrated within processor 604. Computing device 600 can copy data from memory 620 and/or storage device 608 to cache 602 for quicker access by processor 604. In this way, cache 602 may provide a performance boost that avoids delays while processor 604 waits for data. Alternatively, processor 604 may access data directly from memory 620, ROM 617, RAM 616, and/or storage device 608. Memory 620 can include multiple types of homogenous or heterogeneous memory (e.g., such as, but not limited to, magnetic, optical, solid-state, etc.)

Storage device 608 may include one or more non-transitory computer-readable media such as volatile and/or non-volatile memories. A non-transitory computer-readable medium can store instructions and/or data accessible by computing device 600. Non-transitory computer-readable media can include, but is not limited to magnetic cassettes, hard-disk drives (HDD), flash memory, solid state memory devices, digital versatile disks, cartridges, compact discs, random access memories (RAMs) 625, read only memory (ROM) 620, combinations thereof, or the like.

Storage device 608, may store one or more services, such as service 1 610, service 2 612, and service 3 614, that are executable by processor 604 and/or other electronic hardware. The one or more services include instructions executable by processor 604 to: perform operations such as any of the techniques, steps, processes, blocks, and/or operations described herein; control the operations of a device in communication with computing device 600; control the operations of processing unit 610 and/or any special-purpose processors; combinations therefor; or the like. Processor 604 may be a system on a chip (SOC) that includes one or more cores or processors, a bus, memories, clock, memory controller, cache, other processor components, and/or the like. A multi-core processor may be symmetric or asymmetric.

Computing device 600 may include one or more input devices 622 that may represent any number of input mechanisms, such as a microphone, a touch-sensitive screen for graphical input, keyboard, mouse, motion input, speech, media devices, sensors, combinations thereof, or the like. Computing device 600 may include one or more output devices 624 that output data to a user. Such output devices 624 may include, but are not limited to, a media device, projector, television, speakers, combinations thereof, or the like. In some instances, multimodal computing devices can enable a user to provide multiple types of input to communicate with computing device 600. Communications interface 626 may be configured to manage user input and computing device output. Communications interface 626 may also be configured to managing communications with remote devices (e.g., establishing connection, receiving/transmitting communications, etc.) over one or more communication protocols and/or over one or more communication media (e.g., wired, wireless, etc.).

Computing device 600 is not limited to the components as shown if FIG. 6. Computing device 600 may include other components not shown and/or components shown may be omitted.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: receiving a plurality of image; selecting one or more images from the plurality of images; processing the one or more images using a first machine-learning model to generate a first predicted result; processing the one or more images using a plurality of machine-learning models to generate at least a second predicted result and a third test data set, wherein the first machine-learning model is larger than the plurality of machine-learning models; selecting, based on a comparison of the first predicted result with the at least the second predicted result and the third test data set, a second machine-learning model from the plurality of machine-learning models; and processing the plurality of images using the second machine-learning model.

Example 2 is the computer-implemented method of any of example(s) 1 and 3-8, wherein selecting the second machine-learning model from the plurality of machine-learning models comprises: generating a first accuracy value for the first predicted result, a second accuracy value for the second predicted result and a third accuracy value for the third predicted result; comparing the first accuracy value, the second accuracy value, and the third accuracy value, wherein the second machine-learning model is selected based on the second accuracy value being higher than the first accuracy value and the third accuracy value.

Example 3 is the computer-implemented method of any of example(s) 1-2 and 4-8, wherein selecting the second machine-learning model comprises: generating a first value for the first predicted result, a second value for the second predicted result and a third value for the third predicted result using a loss function; comparing the first value, the second value, and the third value, wherein the second machine-learning model is selected based on the second value being higher than the first value and the third value.

Example 4 is the computer-implemented method of any of example(s) 1-3 and 5-8, wherein the second machine-learning model is configured to generate a depth estimation map for images of the plurality of images.

Example 5 is the computer-implemented method of any of example(s) 1-4 and 6-8, wherein the second machine-learning model is configured to execute semantic segmentation for images of the plurality of images.

Example 6 is the computer-implemented method of any of example(s) 1-5 and 7-8, wherein the second machine-learning model is configured to execute instance segmentation using images of the plurality of images.

Example 7 is the computer-implemented method of any of example(s) 1-6 and 8, wherein the plurality of machine-learning models are deep neural networks.

Example 8 is the computer-implemented method of any of example(s) 1-7, wherein the first machine-learning model includes more layers than each of the plurality of machine-learning models.

Example 9 is a system comprising: one or more processors; a non-transitory computer-readable medium storing instructions that when executed by the one or more processors, cause the one or more processors to perform the operations of any of example(s)s 1-8.

Example 10 is a non-transitory computer-readable medium storing instructions that when executed by one or more processors, cause the one or more processors to perform the operations of any of example(s) s 1-8.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A computer-implemented method comprising:
receiving a plurality of images;
selecting one or more images from the plurality of images;
processing the one or more images using a first machine-learning model to generate a first depth map;
processing the one or more images using a plurality of machine-learning models to generate at least a second depth map and a third depth map, wherein the first machine-learning model is larger than the plurality of machine-learning models;
selecting, based on a comparison of the first depth map with the at least the second depth map and the third depth map, a second machine-learning model from the plurality of machine-learning models; and
processing the plurality of images using the second machine-learning model, wherein the second machine-learning model processes the plurality of images by executing a monocular depth estimation process on at least one image of the plurality of images.

2. The computer-implemented method of claim 1, wherein selecting the second machine-learning model from the plurality of machine-learning models comprises:
generating a first accuracy value for the first depth map, a second accuracy value for the second depth map and a third accuracy value for the third depth map; and
comparing the first accuracy value, the second accuracy value, and the third accuracy value, wherein the second machine-learning model is selected based on the second accuracy value being higher than the first accuracy value and the third accuracy value.

3. The computer-implemented method of claim 1, wherein selecting the second machine-learning model comprises:
generating a first value for the first depth map, a second value for the second depth map and a third value for the third depth map using a loss function; and
comparing the first value, the second value, and the third value, wherein the second machine-learning model is selected based on the second value being higher than the first value and the third value.

4. The computer-implemented method of claim 1, wherein the second machine-learning model is configured to generate a depth estimation map for images of the plurality of images.

5. The computer-implemented method of claim 1, wherein the second machine-learning model is configured to execute semantic segmentation for images of the plurality of images.

6. The computer-implemented method of claim 1, wherein the second machine-learning model is configured to execute instance segmentation using images of the plurality of images.

7. The computer-implemented method of claim 1, wherein the plurality of machine-learning models are deep neural networks.

8. The computer-implemented method of claim 1, wherein the first machine-learning model includes more layers than each of the plurality of machine-learning models.

9. A system comprising:
one or more processors; and
a non-transitory computer-readable medium storing instructions that when executed by the one or more processors, cause the one or more processors to:
receiving a plurality of images;

selecting one or more images from the plurality of images;

processing the one or more images using a first machine-learning model to generate a first depth map;

processing the one or more images using a plurality of machine-learning models to generate at least a second depth map and a third depth map, wherein the first machine-learning model is larger than the plurality of machine-learning models;

selecting, based on a comparison of the first depth map with the at least the second depth map and the third depth map, a second machine-learning model from the plurality of machine-learning models; and processing the plurality of images using the second machine-learning model, wherein the second machine-learning model processes the plurality of images by executing a monocular depth estimation process on at least one image of the plurality of images.

10. The system of claim 9, wherein, to select the second machine-learning model from the plurality of machine-learning models, the instructions, when executed by the one or more processors, cause the one or more processors to:

generating a first accuracy value for the first depth map, a second accuracy value for the second depth map and a third accuracy value for the third depth map; and comparing the first accuracy value, the second accuracy value, and the third accuracy value, wherein the second machine-learning model is selected based on the second accuracy value being higher than the first accuracy value and the third accuracy value.

11. The system of claim 9, wherein, to select the second machine-learning model from the plurality of machine-learning models, the instructions, when executed by the one or more processors, cause the one or more processors to:

generating a first value for the first depth map, a second value for the second depth map and a third value for the third depth map using a loss function; and comparing the first value, the second value, and the third value, wherein the second machine-learning model is selected based on the second value being higher than the first value and the third value.

12. The system of claim 9, wherein the second machine-learning model is configured to generate a depth estimation map for images of the plurality of images.

13. The system of claim 9, wherein the second machine-learning model is configured to execute semantic segmentation for images of the plurality of images.

14. The system of claim 9, wherein the second machine-learning model is configured to execute instance segmentation using images of the plurality of images.

15. The system of claim 9, wherein the plurality of machine-learning models are deep neural networks.

16. The system of claim 9, wherein the first machine-learning model includes more layers than each of the plurality of machine-learning models.

17. A non-transitory computer-readable medium storing instructions that when executed by one or more processors, cause the one or more processors to:

receiving a plurality of images;

selecting one or more images from the plurality of images;

processing the one or more images using a first machine-learning model to generate a first depth map;

processing the one or more images using a plurality of machine-learning models to generate at least a second depth map and a third depth map, wherein the first machine-learning model is larger than the plurality of machine-learning models;

selecting, based on a comparison of the first depth map with the at least the second depth map and the third depth map, a second machine-learning model from the plurality of machine-learning models; and processing the plurality of images using the second machine-learning model, wherein the second machine-learning model processes the plurality of images by executing a monocular depth estimation process on at least one image of the plurality of images.

18. The non-transitory computer-readable medium of claim 17, wherein, to select the second machine-learning model from the plurality of machine-learning models, the instructions, when executed by the one or more processors, cause the one or more processors to:

generating a first accuracy value for the first depth map, a second accuracy value for the second depth map and a third accuracy value for the third depth map; and comparing the first accuracy value, the second accuracy value, and the third accuracy value, wherein the second machine-learning model is selected based on the second accuracy value being higher than the first accuracy value and the third accuracy value.

19. The non-transitory computer-readable medium of claim 17, wherein, to select the second machine-learning model from the plurality of machine-learning models, the instructions, when executed by the one or more processors, cause the one or more processors to:

generating a first value for the first depth map, a second value for the second depth map and a third value for the third depth map using a loss function; and comparing the first value, the second value, and the third value, wherein the second machine-learning model is selected based on the second value being higher than the first value and the third value.

20. The non-transitory computer-readable medium of claim 17, wherein the second machine-learning model is configured to at least one of generate a depth estimation map for images of the plurality of images, execute semantic segmentation for images of the plurality of images, or execute instance segmentation using images of the plurality of images.

* * * * *